United States Patent
Hammack

(10) Patent No.: US 9,229,095 B2
(45) Date of Patent: Jan. 5, 2016

(54) ADAPTIVE DYNAMIC CLUSTER DEINTERLEAVING

(71) Applicant: Raytheon Company, Waltham, MA (US)

(72) Inventor: George D. Hammack, Goleta, CA (US)

(73) Assignee: Raytheon Company, Waltham, MA (US)

( * ) Notice: Subject to any disclaimer, the term of this patent is extended or adjusted under 35 U.S.C. 154(b) by 229 days.

(21) Appl. No.: 14/064,566

(22) Filed: Oct. 28, 2013

(65) Prior Publication Data

US 2015/0116141 A1    Apr. 30, 2015

(51) Int. Cl.
*G01S 7/02* (2006.01)
*G01S 7/292* (2006.01)
*G01S 7/285* (2006.01)
*G01S 7/00* (2006.01)
*G01S 13/00* (2006.01)

(52) U.S. Cl.
CPC .............. *G01S 7/021* (2013.01); *G01S 7/285* (2013.01); *G01S 7/2923* (2013.01)

(58) Field of Classification Search
CPC ............ G01S 7/02; G01S 7/021; G01S 7/28; G01S 7/285; G01S 7/292; G01S 7/2923; G01S 13/87; G01S 5/02; G01S 5/04; G01S 7/36; G01S 7/40
USPC ............ 342/89–103, 118, 134, 135, 165, 342/173–175, 195, 13–20, 42, 46, 47, 342/145–147, 350, 378–380; 708/100, 200, 708/212; 706/15, 16, 20; 702/127, 189, 190
See application file for complete search history.

(56) References Cited

U.S. PATENT DOCUMENTS

| | | | | | |
|---|---|---|---|---|---|
| 4,516,220 A | * | 5/1985 | Baumann | ............. | G01S 7/021 708/212 |
| 4,721,958 A | * | 1/1988 | Jenkin | .............. | G01S 7/021 342/13 |
| 4,879,561 A | * | 11/1989 | Inkol | .............. | G01S 7/021 342/13 |
| 4,918,455 A | * | 4/1990 | Maier | .............. | G01S 7/021 342/13 |
| 5,247,311 A | * | 9/1993 | Sobocinski | ............. | G01S 7/021 342/47 |
| 5,276,772 A | * | 1/1994 | Wang | .............. | G01S 7/021 706/20 |
| 5,534,866 A | * | 7/1996 | Rose | .............. | G01S 7/021 342/13 |
| 5,563,806 A | * | 10/1996 | Barry | .............. | G01S 7/021 702/190 |
| 5,583,505 A | * | 12/1996 | Andersen | .............. | G01S 7/021 342/13 |
| 5,689,274 A | * | 11/1997 | Rose | .............. | G01S 5/02 342/146 |
| 6,100,845 A | * | 8/2000 | Rose | .............. | G01S 5/04 342/98 |
| 6,130,643 A | * | 10/2000 | Trippett | .............. | G01S 7/36 342/380 |
| 6,147,646 A | * | 11/2000 | Arneson | .............. | G01S 7/021 342/13 |
| 6,985,102 B1 | * | 1/2006 | Horn | .............. | G01S 7/021 342/13 |
| 7,133,887 B2 | | 11/2006 | Sirois | | |
| 7,397,415 B1 | * | 7/2008 | Wang | .............. | G01S 7/021 342/13 |
| 7,760,135 B2 | * | 7/2010 | Driggs | .............. | G01S 7/021 342/90 |
| 7,830,297 B1 | * | 11/2010 | Wang | .............. | G01S 7/021 342/13 |
| 8,013,782 B2 | * | 9/2011 | Valand | .............. | G01S 7/021 342/13 |
| 8,102,297 B2 | * | 1/2012 | Drake | .............. | G01S 7/021 342/13 |
| 8,531,330 B2 | * | 9/2013 | Song | .............. | G01S 7/021 342/13 |
| 8,587,468 B2 | * | 11/2013 | Card | .............. | G01S 7/021 342/13 |
| 9,063,210 B2 | * | 6/2015 | Hammack | .............. | G01S 7/2923 1/1 |

* cited by examiner

*Primary Examiner* — Bernarr Gregory
(74) *Attorney, Agent, or Firm* — Burns & Levinson, LLP; Joseph M. Maraia

(57) ABSTRACT

Described herein are methods and systems capable of dynamically adapting weights in response to a received stream of pulses by deinterleaving a stream of pulses according to an initial weighted distance, adjusting the weighted distance, and deinterleaving the stream of pulses according to the adjusted weighted distance.

14 Claims, 8 Drawing Sheets

ADAPTIVE DYNAMIC CLUSTER DEINTERLEAVING

TECHNICAL FIELD

The present disclosure relates generally to the field of analyzing received radar pulses. More particularly, this application relates to the technology of deinterleaving interleaved radar pulses received from multiple sources.

BACKGROUND

When a military asset such as an aircraft is simultaneously illuminated by multiple radar systems (threat systems), it may be useful to sort the received radar pulses into groups, or clusters, according to their source. An asset may, for example, be illuminated by several different radars from different directions, each having a different combination of amplitude, carrier frequency, pulse width, and modulation type. The received radar pulses may be detected and analyzed by a radar analysis system such as a radar warning receiver (RWR), which may then identify each source as being, for example, ship-board radar, aircraft radar, or missile radar.

Radar pulses from multiple sources may be interleaved in time when they arrive at the radar analysis system. As a first step in analyzing the received pulses it may be desirable to deinterleave them (i.e., to form multiple individual pulse trains, each corresponding to one of the radar sources as illustrated, for example, in FIG. 1). This may be particularly important for determining certain characteristics of each source: in a stream of pulses from several sources, for example, each operating at a different pulse repetition interval (PRI), it is difficult to infer the PRI of any one source without first separating (i.e., deinterleaving), the stream into separate pulse trains, one pulse train for each source (e.g., as illustrated in FIG. 1). Once the stream is deinterleaved the PRI of each source is, in the ideal case, simply the rate at which pulses occur in the corresponding pulse train. Even if some pulses are lost in processing, the PRI of a given source may be estimated from the remaining pulses, for example by inserting pulses as needed to produce a regular sequence of pulses. Other attributes such as the carrier frequency may be determined from a single pulse, but it may be possible to determine it more accurately from a series of pulses originating from the same source.

Prior art systems may perform deinterleaving by grouping received pulses into "clusters" of similar pulses. Pulses that are, according to some measure of similarity, sufficiently similar, are deemed to have originated from a single source, and pulses that are dissimilar are deemed to have originated from different sources. Various attributes, or parameters, may be compared when assessing the degree of dissimilarity, or "distance," between pulses, including frequency, the direction from which the pulses arrived or angle of arrival (AOA), pulse width, and amplitude. A weighted measure of distance may be used. In such a measure a weight may be defined for each parameter and differences in any parameter multiplied by the corresponding weight.

Selecting the weights for a weighted distance generally involves making a compromise between the respective likelihoods of two types of error. If a weight is made too large (i.e., the distance and resulting cluster window are too small), pulses originating from the same source may be incorrectly classified as originating from different sources; if the weight is made too small (i.e., the distance and resulting cluster window are too big), pulses originating from different sources may incorrectly be classified as originating from the same source. If the measurement error in a parameter is large, it may be preferable to use a small weight, so that variations in the measured value due to measurement error do not cause pulses, which in fact are quite similar, to be classified as originating from different sources. Thus the optimum weights may vary, depending on operating conditions. At high temperature, for example, amplifier noise in the receiver may cause the measurement error for some parameters to increase, with the result that smaller weights may be preferred at higher temperatures.

In prior art deinterleavers, the weights may be static (fixed) prior to operation, and they may be independent of the pulse parameters. However, modern, more advanced radar emitters are capable of dynamically varying and randomizing signal parameters, such as for example, waveform, frequency, pulse width, and/or pulse repetition interval. When faced with such advanced radar emitter threats, traditional static weight deinterleavers will either fail to identify the threat entirely, or will misidentify the threat.

SUMMARY

A need therefore exists for deinterleaving methods and systems capable of dynamically adapting weights in response to a received stream of pulses. It would be desirable to provide such methods and systems having the capability to adapt the weights according to known threat capabilities while also having the capability to more randomly adapt the weights according to cognitive and/or adaptive algorithms. In doing so, it would also be desirable to minimize consumption of processing resources.

In one aspect, at least one embodiment described herein provides a method for adaptive dynamic cluster deinterleaving of received radar pulses in a radar system. The method includes deinterleaving a stream of pulses received by a radar receiver by determining whether each of a plurality of received pulses is a member of one or more clusters. Each cluster includes an anchor point. Each received pulse and the anchor point include a respective feature vector. Each feature vector includes at least two features, wherein the at least two features are selected from at least two measured features of each received pulse. The step of deinterleaving a stream of pulses received by a radar receiver includes generating at least one weight corresponding to each of the at least two features. The step of deinterleaving a stream of pulses received by a radar receiver also includes calculating, using the at least one weight, a weighted distance between the feature vector of each received pulse and the feature vector of the anchor point. The step of deinterleaving a stream of pulses received by a radar receiver also includes comparing the weighted distance to a distance threshold. The step of deinterleaving a stream of pulses received by a radar receiver also includes identifying the received pulse as a member of one of the one or more clusters if the weighted distance is less than the distance threshold.

The method also includes adjusting the at least one weight corresponding to one or more of the at least two features. The step of adjusting includes selecting one or more reference features from the at least two measured features. The step of adjusting also includes acquiring, for each cluster, a measured value of the one or more reference features for each member of the cluster. The step of adjusting also includes calculating, for each cluster, a variance of the measured values of each member of the cluster. The step of adjusting also includes comparing the variance of the measured values to a threshold variance. The step of adjusting also includes increasing at least one of the at least one weights if the variance is less than the threshold variance or decreasing at least one of the at least one weights if the variance is greater than the threshold variance to generate at least one adjusted weight.

The method also includes deinterleaving the stream of pulses using the at least one adjusted weight by determining whether each of the plurality of received pulses is a member of one or more adjusted clusters. Each adjusted cluster includes an adjusted anchor point. Each received pulse and the adjusted anchor point include a respective adjusted feature vector. Each adjusted feature vector includes at least two adjusted features correlating to the at least one adjusted weight. The step of deinterleaving the stream of pulses using the at least one adjusted weight includes calculating, using the at least one adjusted weight, an adjusted weighted distance between the adjusted feature vector of the received pulse and the adjusted feature vector of the adjusted anchor point. The step of deinterleaving the stream of pulses using the at least one adjusted weight also includes comparing the adjusted weighted distance to an adjusted distance threshold. The step of deinterleaving the stream of pulses using the at least one adjusted weight also includes identifying the received pulse as a member of the one or more adjusted clusters if the adjusted weighted distance is less than the adjusted distance threshold.

Any of the aspects and/or embodiments described herein can include one or more of the following embodiments. In some embodiments, the method includes iterating, at least once, the step of adjusting the at least one weight. In some embodiments, the method includes iterating, at least once, the step of deinterleaving the stream of pulses using the at least one adjusted weight. In some embodiments, the method includes identifying, using a cognitive threat matching system, one or more radar transmitters associated with one or more values of at least one of the measured features of the members of at least one of the adjusted clusters.

In some embodiments, the step of generating at least one weight includes providing weights for the at least two features according to known radar transmitter operating parameters. In some embodiments, the step of generating at least one weight includes randomly selecting weights for each of at least two features. In some embodiments, the weighted distance is calculated in accordance with $d(x,y)=\sqrt{(x-y)^T B(x-y)}$, wherein x is the feature vector of a particular received pulse, y is the feature vector of the anchor point, and B is a weighting matrix.

In one aspect, at least one embodiment described herein provides a method for adaptive dynamic cluster deinterleaving of received radar pulses in a radar system. The method includes deinterleaving a stream of pulses received by a radar receiver by determining whether each of a plurality of received pulses is a member of one or more clusters. Each cluster includes an anchor point. Each received pulse and the anchor point include a respective feature vector. Each feature vector includes at least two features, wherein the at least two features are selected from at least two measured features of each received pulse. The step of deinterleaving a stream of pulses received by a radar receiver includes generating at least one weight corresponding to each of the at least two features. The step of deinterleaving a stream of pulses received by a radar receiver also includes calculating, using the at least one weight, a weighted distance between the feature vector of each received pulse and the feature vector of the anchor point. The step of deinterleaving a stream of pulses received by a radar receiver also includes comparing the weighted distance to a distance threshold. The step of deinterleaving a stream of pulses received by a radar receiver also includes identifying the received pulse as a member of one of the one or more clusters if the weighted distance is less than the distance threshold.

The method also includes adjusting the at least one weight corresponding to one or more of the at least two features. The step of adjusting includes selecting one or more reference features from the at least two measured features. The step of adjusting also includes acquiring, for each cluster, a measured value of the one or more reference features for each member of the cluster. The step of adjusting also includes calculating, for each cluster, a variance of the measured values of each member of the cluster. The step of adjusting also includes comparing the variance of the measured values to a threshold variance. The step of adjusting also includes decreasing at least one of the at least one weights if the variance is greater than the threshold variance to generate at least one adjusted weight. The step of adjusting also includes removing, for each cluster having a variance less than the threshold variance, each member of the cluster from the stream of pulses to generate an adjusted stream of pulses.

The method also includes deinterleaving the adjusted stream of pulses using the at least one adjusted weight by determining whether each of a plurality of adjusted pulses is a member of one or more adjusted clusters. Each adjusted cluster includes an adjusted anchor point. Each adjusted pulse and the adjusted anchor point include a respective adjusted feature vector. Each adjusted feature vector having at least two adjusted features correlating to the at least one adjusted weight. The step of deinterleaving the adjusted stream of pulses using the at least one adjusted weight includes calculating, using the at least one adjusted weight, an adjusted weighted distance between the adjusted feature vector of the adjusted pulse and the adjusted feature vector of the adjusted anchor point. The step of deinterleaving the adjusted stream of pulses using the at least one adjusted weight also includes comparing the adjusted weighted distance to an adjusted distance threshold. The step of deinterleaving the adjusted stream of pulses using the at least one adjusted weight also includes identifying the adjusted pulse as a member of the one or more adjusted clusters if the adjusted weighted distance is less than the adjusted distance threshold.

Any of the aspects and/or embodiments described herein can include one or more of the following embodiments. In some embodiments, the method includes iterating, at least once, the step of adjusting the at least one weight. In some embodiments, the method includes iterating, at least once, the step of deinterleaving the adjusted stream of pulses using the at least one adjusted weight.

In one aspect, at least one embodiment described herein provides a system for adaptive dynamic cluster deinterleaving of received radar pulses in a radar system. The system includes one or more processors. The system also includes a memory, the memory including executable code representing instructions. The instructions, when executed, cause the one or more processors to deinterleave a stream of pulses received by a radar receiver by determining whether each of a plurality of received pulses is a member of one or more clusters. Each cluster includes an anchor point. Each received pulse and the anchor point include a respective feature vector. Each feature vector includes at least two features, wherein the at least two features are selected from at least two measured features of each received pulse. The step of deinterleaving a stream of pulses received by a radar receiver includes generating at least one weight corresponding to each of the at least two features. The step of deinterleaving a stream of pulses received by a radar receiver also includes calculating, using the at least one weight, a weighted distance between the feature vector of each received pulse and the feature vector of the anchor point. The step of deinterleaving a stream of pulses received by a radar receiver also includes comparing the weighted distance to a distance threshold. The step of deinterleaving a stream of pulses received by a radar receiver also includes identifying the received pulse as a member of one of the one or more clusters if the weighted distance is less than the distance threshold.

The instructions, when executed, also cause the one or more processors to adjust the at least one weight corresponding to one or more of the at least two features. The step of adjusting includes selecting one or more reference features from the at least two measured features. The step of adjusting also includes acquiring for each cluster, a measured value of the one or more reference features for each member of the cluster. The step of adjusting also includes calculating for each cluster, a variance of the measured values of each member of the cluster. The step of adjusting also includes comparing the variance of the measured values to a threshold variance. The step of adjusting also includes increasing at least one of the at least one weights if the variance is less than the threshold variance or decreasing at least one of the at least one weights if the variance is greater than the threshold variance to generate at least one adjusted weight.

The instructions, when executed, also cause the one or more processors to deinterleave the stream of pulses using the at least one adjusted weight by determining whether each of the plurality of received pulses is a member of one or more adjusted clusters. Each adjusted cluster including an adjusted anchor point. Each received pulse and the adjusted anchor point including a respective adjusted feature vector. Each adjusted feature vector including at least two adjusted features correlating to the at least one adjusted weight. The step of deinterleaving the stream of pulses using the at least one adjusted weight includes calculating, using the at least one adjusted weight, an adjusted weighted distance between the adjusted feature vector of the received pulse and the adjusted feature vector of the adjusted anchor point. The step of deinterleaving the stream of pulses using the at least one adjusted weight also includes comparing the adjusted weighted distance to an adjusted distance threshold. The step of deinterleaving the stream of pulses using the at least one adjusted weight also includes identifying the received pulse as a member of the one or more adjusted clusters if the adjusted weighted distance is less than the adjusted distance threshold.

Any of the aspects and/or embodiments described herein can include one or more of the following embodiments. In some embodiments, the system also includes a radar receiver for receiving the stream of pulses. In some embodiments, the system also includes a transmitter for transmitting one or more measured values of the at least two measured features of each member of each cluster and each adjusted cluster to a cognitive threat matching system. In some embodiments, the cognitive threat matching system identifies one or more radar transmitters associated with one or more values of at least one of the measured features of the members of at least one of the adjusted clusters.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

In the following detailed description of the illustrated embodiments, reference is made to accompanying drawings, which form a part thereof, and within which are shown by way of illustration, specific embodiments, by which the subject matter may be practiced. It is to be understood that other embodiments may be utilized and structural changes may be made without departing from the scope of the disclosure.

The particulars shown herein are by way of example and for purposes of illustrative discussion of the embodiments only and are presented in the case of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in that how the several forms of the present disclosure may be embodied in practice. Further, like reference numbers and designations in the various drawings indicate like elements.

The term receiving antenna, as used herein, can include one or more of a parabolic dish antenna, a cassegrain antenna, a phased array, a linear array, a planar array, a crow's nest array, a monopulse antenna, a slotted waveguide, any duplexed antenna, and/or any other suitable receiving antenna.

The term receiver, as used herein, can include one or more of a superheterodyne receiver, a double heterodyne receiver, a radar warning receiver, and/or any other suitable receiver.

The term processor, as used herein, includes both general and special purpose microprocessors, field programmable gate arrays (FPGA), application-specific integrated circuits (ASIC), and/or any one or more processors of any kind of digital computer.

The term memory, as used herein, includes, but is not limited to, read-only memory, random access memory, mass storage devices (e.g., magnetic, magneto-optical disks, or optical disks), EPROM, EEPROM, flash memory devices, magnetic disks, internal hard disks, removable disks, CD-ROM, and/or DVD-ROM disks.

Described herein are devices and techniques for adaptive dynamic cluster deinterleaving of received radar pulses in a radar system by cluster deinterleaving a stream of radar pulses received by a radar receiver, adjusting a weighted distance associated with the cluster deinterleaving, and repeating the cluster deinterleaving using the adjusted weighted distance. In accordance with various embodiments, one or more pulses is removed from the stream of pulses prior to repeating the cluster deinterleaving.

Figure 2:
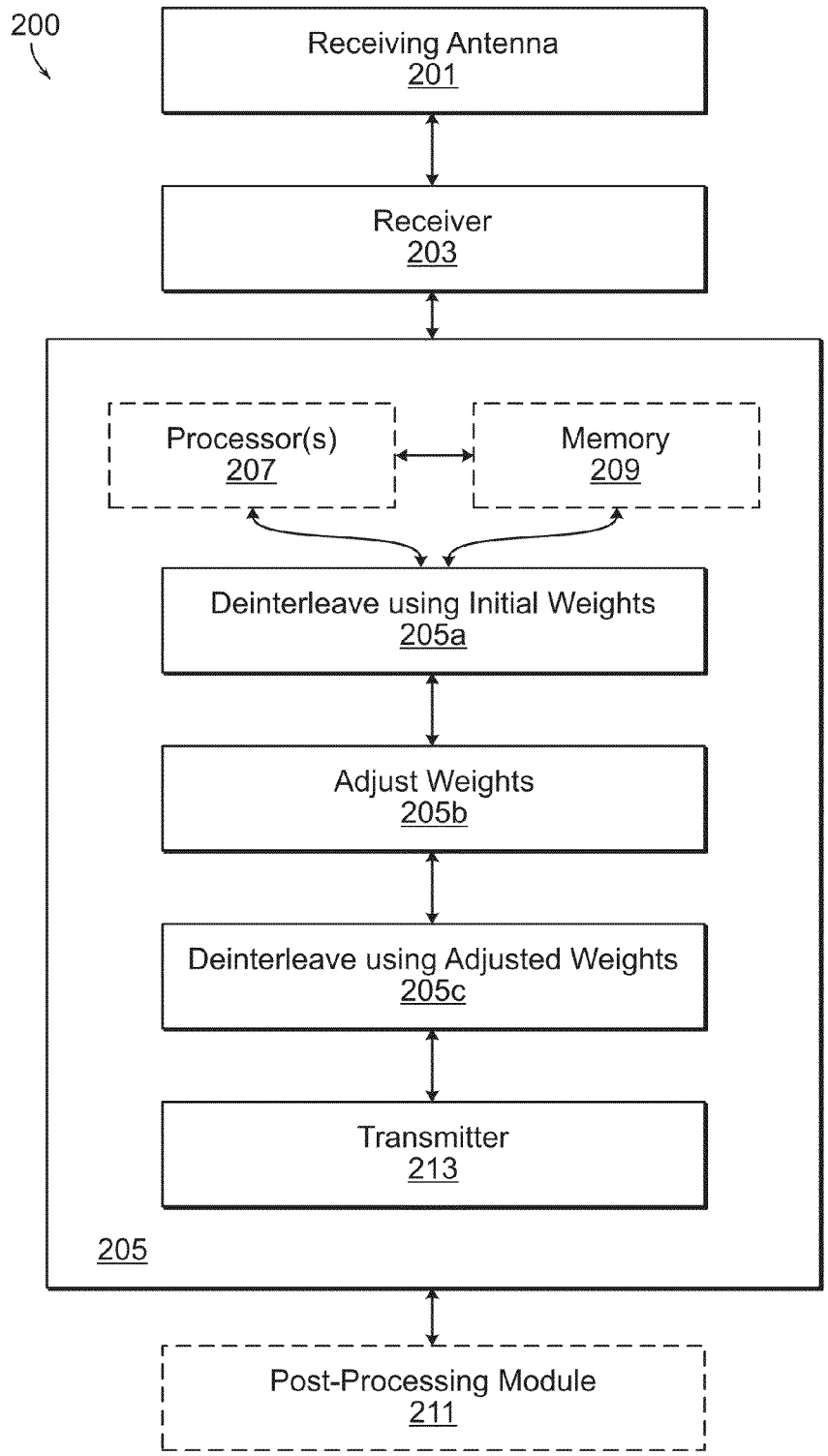
FIG. 2 is a block diagram illustrating an adaptive dynamic cluster deinterleaving system in accordance with various embodiments.

Referring to FIG. 2, in accordance with various embodiments, an adaptive dynamic cluster deinterleaving system 200 includes a receiving antenna 201 connected to a receiver 203 receives incoming radar pulses. The receiver 203 then characterizes each received pulse in terms of various parameters, including for example amplitude, time of arrival, pulse width, angle of arrival in azimuth and elevation, intentional modulation on the pulse (IMoP), pulse rise time, and carrier frequency, and delivers a stream of pulse parameter vectors to an adaptive dynamic cluster deinterleaver 205.

The adaptive dynamic cluster deinterleaver 205 assigns an initial set of weights to the various parameters and uses those initial weights to deinterleave the received radar pulses 205a. The initial set of weights can, in accordance with various embodiments, be assigned according to known parameters measured from threat systems, be randomly generated, and/or be assigned according to a statistical distribution (e.g., a Gaussian distribution, a Rayleigh distribution, a normal distribution, a log-normal distribution, a gamma distribution, a binomial distribution, a Cauchy distribution, a Weibull distribution, or any other suitable statistical distribution).

When assigning weights it is important to note that not all parameters may be useful for the purpose of classifying the pulses into clusters. A parameter may vary so little between different transmitting radar systems that its variation cannot be measured in a meaningful way and its use may therefore not facilitate the classification of the received pulses. The adaptive dynamic cluster deinterleaver 205 may therefore select a subset of the received parameters to be assigned weights for use in classifying the received pulses into clusters. The parameters in this subset are known as "features," and they form a feature vector for each pulse to be classified. Each n-dimensional feature vector corresponds to a point in the n-dimensional feature space, and the terms "point," "feature vector," and "pulse" are used interchangeably herein to denote a given pulse's features.

Figure 1:
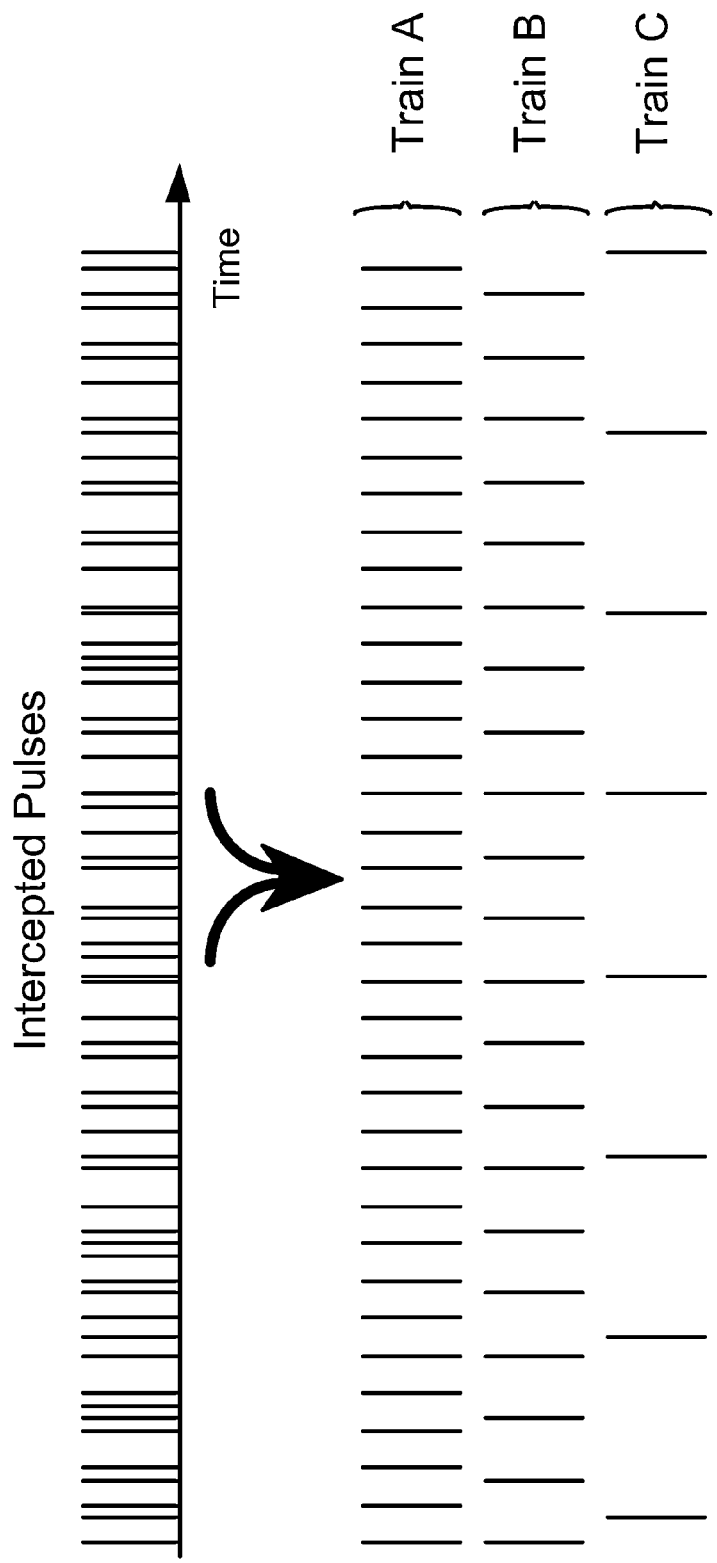
FIG. 1 is a diagram illustrating a stream of intercepted pulses being separated into multiple pulse trains in accordance with the general purpose of deinterleaving.

During deinterleaving, the dynamic cluster deinterleaver 205 classifies the pulses into clusters and outputs the contents of each cluster as a separate pulse train (e.g., as shown in FIG. 1). During the classification process, each received pulse may be classified as part of a cluster, or not, depending on whether it is sufficiently close to the center of the cluster. This determination may be made by a measure of distance using the weights.

The first pulse received, and any subsequently received pulse which is not sufficiently similar to previously received pulses, becomes an "anchor point" which defines a new cluster centered on that anchor point. Whether a subsequently received pulse belongs in an established cluster may be determined by the degree of dissimilarity, or distance, between the subsequently received pulse and the anchor point for the cluster. If the distance between the pulse and the anchor point is less than a predetermined threshold distance, then the pulse is classified as belonging to the cluster. If the distance exceeds the threshold then the pulse becomes a new anchor point. Equivalently, any pulse falling within a "window" around the anchor point is classified as belonging to the cluster. This window is the region of feature space within which all points are nearer the anchor point than the threshold distance. For the classification technique to be unambiguous, the windows must not overlap.

The distance d between a pulse to be classified and an anchor point may be calculated, for example, as the Euclidean distance, given by N $$d(x, y) = \sqrt{\sum_{i=1}^{N} (x_i - y_i)^2}$$ Eqn. 1 where x is the anchor point feature vector and y is the feature vector of the pulse to be classified, and $x_i$ and $y_i$ are the $i^{th}$ features (i.e., the $i^{th}$ elements of the feature vectors) of the anchor point and of the pulse to be classified, respectively.

It may be preferable to use a weighted distance. As used herein, a "weighted distance" is any measure of dissimilarity using weights. An example of a weighted distance is the normalized Euclidean distance, given by $$d(x, y) = \sqrt{\sum_{i=1}^{N} \frac{(x_i - y_i)^2}{\sigma_i^2}}$$ Eqn. 2 where $\sigma_i^2$ is the variance of the $i^{th}$ feature (parameter). Another example is the more general weighted $l_2$ distance, given by $$d(x,y) = \sqrt{(x-y)^T B(x-y)}$$ Eqn. 3 where B is a matrix of weights, and x is again the anchor point feature vector and y the feature vector of the pulse to be classified. If the matrix of weights B is the inverse covariance matrix, then this distance is the Mahalanobis distance. Each anchor point may have a set of weights associated with it, to be used for calculating the distance between the anchor point and any pulse.

Additionally, due to the adaptive, dynamic nature of the adaptive dynamic cluster deinterleaving system 200, more complex weighted distance algorithms can be used. For example, a dynamic normalized Euclidean distance can be used, given by $$d(x, y) = \sqrt{\sum_{i=1}^{N} \frac{(x_i - y_i)^2}{\sigma_{func(i,j,t)}^2}}$$ Eqn. 4 where $\sigma_{func(i,j,t)}^2$, is a variance of the $i^{th}$ feature which can vary over multiple iterations j of the adaptive dynamic cluster deinterleaving system 200 and be modified over time t (e.g., by adjusting the weights assigned to one or more parameters as further described below), rather than being a static variance of the $i^{th}$ feature as in $\sigma_i^2$ of Eqn. 2 above.

In a traditional cluster deinterleaving system having static weights, if a pulse falls outside a cluster window but sufficiently close to the window that making the pulse into an anchor point would result in overlapping windows, then it is necessary to discard the point, or analyze the size of one or both windows during post-processing to eliminate the overlap. However, as described in further detail below, the adaptive dynamic cluster deinterleaver 205 is capable of dynamically and adaptively adjusting the weights 205b based on the results of the initial deinterleaving 205a and iterating the cluster deinterleaving using the adjusted weights 205c to seek out additional clusters. This process also provides the adaptive dynamic cluster deinterleaver 205 a means to attenuate the likelihood of the two competing errors, discussed above, associated with weight selection/window size (i.e., over-inclusion for large windows and under-inclusion for small windows).

When adjusting the weights 205b, the adaptive dynamic cluster deinterleaver 205 first selects a reference feature and a threshold variance for that reference feature. The reference feature may, in accordance with various embodiments, include a feature that is not easily varied (e.g., angle of arrival (AOA) is not easily varied by a ground-based threat). The variance of the reference feature amongst the pulses in each particular cluster is then determined. If one or more of the clusters exhibits a variance that is higher than the threshold (e.g., greater than $2\sigma$), one or more of the weights can be increased by the adaptive dynamic cluster deinterleaver 205 to shrink the cluster window. Alternatively, if one or more of the clusters exhibits a variance that is less than the threshold (e.g., less than $2\sigma$), one or more of the weights can be decreased by the adaptive dynamic cluster deinterleaver 205 to expand the cluster window. Adjustment of the weights can be performed according to any suitable known method of reducing error, including for example, by Kalman filtering, Gaussian regression, any other regression method, and/or any genetic algorithm.

In some embodiments one or more clusters will have a variance which is less than the threshold (i.e., in-tolerance) and one or more clusters will have a variance which exceeds the threshold (i.e., out of tolerance). As described in further detail below with reference to FIGS. 4A-4B, in accordance with some such embodiments, the adaptive dynamic cluster deinterleaver 205 can remove pulses associated with in-tolerance clusters prior to deinterleaving the stream of pulses using the adjusted weights 205c. This technique allows the system 200 to remove known threats matching predetermined conditions from the process, thereby reducing the number of pulses that are subsequently deinterleaved using the adjusted weights 205c as described in further detail below. Reducing the number of pulses being deinterleaved can, in various embodiments, be advantageous because deinterleaving fewer pulses reduces the time and processing resources required to perform the deinterleaving.

In accordance with various embodiments, the adaptive dynamic cluster deinterleaver 205 then deinterleaves the stream of pulses using the adjusted weights 205c. Deinterleaving using the adjusted weights 205c can be, for example but not limited to, performed in a substantially similar manner to the deinterleaving using the initial weights 205a as described above. However, as will be apparent in view of this disclosure, in the deinterleaving of 205c, the initial weights of 205a are replaced with the adjusted weights generated by adjusting 205b.

It will be apparent in view of this disclosure that adjusting the weights 205b and deinterleaving using the adjusted weights 205c can be performed iteratively in accordance with various embodiments. In order to prevent an infinite loop in the event of a divergent solution, the adaptive dynamic cluster deinterleaver 205 can also include a time limit or an overall variance threshold to act as a cutoff for terminating deinterleaving activities associated with a particular stream of pulses. In accordance with various embodiments, the cutoff may be correlated to the adaptive dynamic cluster deinterleaver 205 acquiring a new stream of pulses from the receiving antenna 201 and receiver 203.

The adaptive dynamic cluster deinterleaver 205 can optionally include one or more processors 207 for processing the pulses and performing the deinterleaving using the initial weights 205a, the adjusting weights 205b, and the deinterleaving using the adjusted weights 205c. The adaptive dynamic cluster deinterleaver 205 can also optionally include a memory 209 for storing pulse data, storing cluster data, storing known parameters measured from threat systems, storing variance thresholds, storing cutoff limits, and/or providing executable instructions (e.g., for determining initial weights, for deinterleaving using the initial weights 205a, for adjusting the weights 205b, and/or for deinterleaving using the adjusted weights).

The adaptive dynamic cluster deinterleaving system 200 can optionally include a post-processing module 211 or be configured to transmit deinterleaved pulse train data via a transmitter 213 to the post-processing module 211. The post-processing module can be, for example but not limited to, a cognitive threat matching system, an electronic warfare system, or any other suitable system.

The adaptive dynamic cluster deinterleaving system 200 can also optionally be configured to receive feeback from the post-processing module 211. Feedback received from the post-processing module 211 can include assessments of the inclusiveness, quality, and/or accuracy of one or more pulse trains previously deinterleaved by the adaptive dynamic cluster deinterleaving system 200. Such feedback can, for example, be used by the adaptive dynamic cluster deinterleaving system 200 to change and/or improve functions such as, selecting the initial weights, the methods/algorithms used to vary the weights, and/or any other feature or function of the adaptive dynamic cluster deinterleaving system 200. Thereby, the adaptive dynamic cluster deinterleaving system 200 provides for a self-learning function, wherein the accuracy and quality of the deinterleaved pulse trains is automatically improved by the system 200. In various embodiments, feedback from the post-processing module 211 can be stored in the memory 209.

Figure 3:
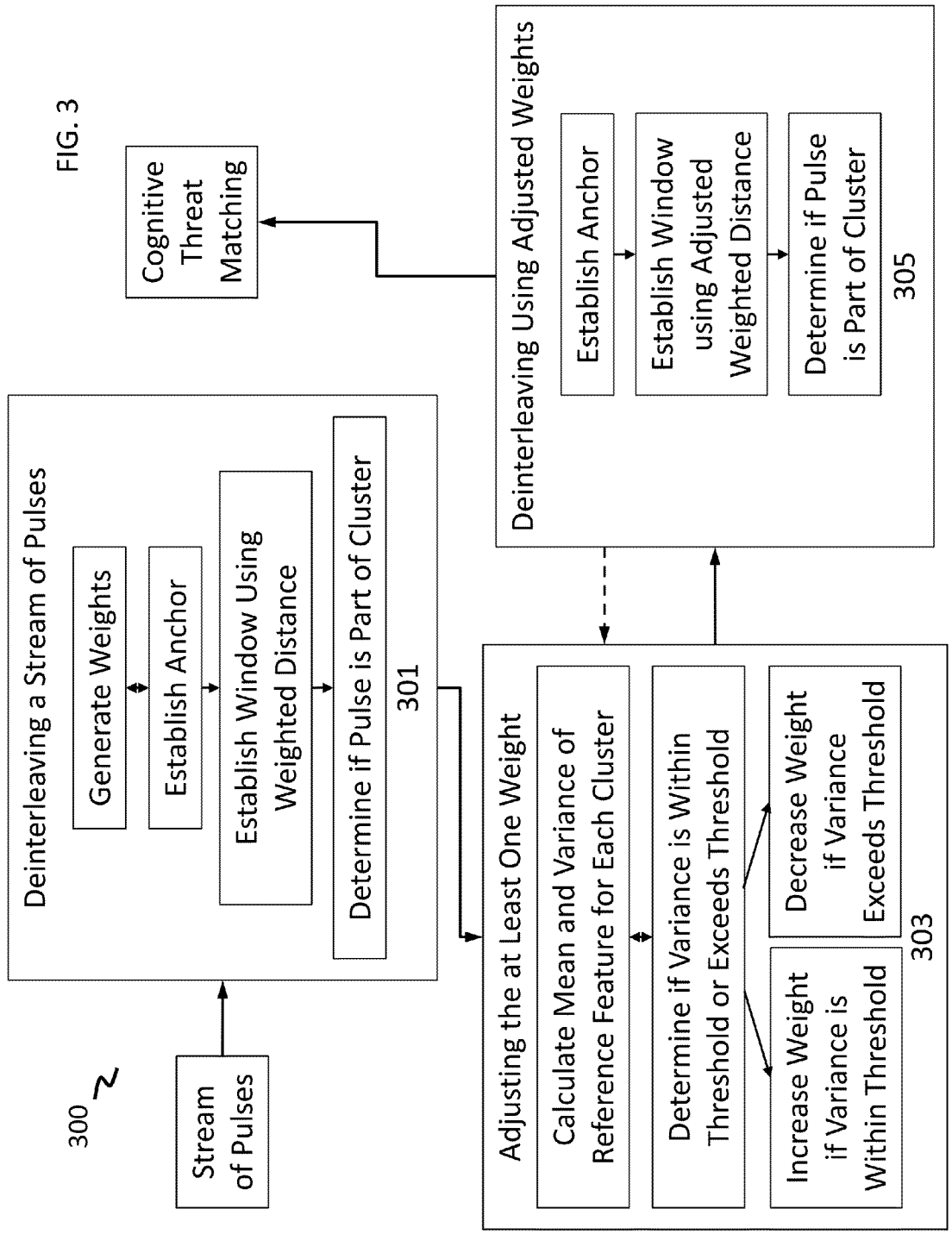
FIG. 3 is a flow chart illustrating a method for performing adaptive dynamic cluster deinterleaving in accordance with various embodiments.

With reference to FIG. 3, a method 300 for adaptive dynamic cluster deinterleaving in accordance with various embodiments includes the steps of deinterleaving a stream of pulses received by a radar receiver 301, adjusting the at least one weight corresponding to one or more of the at least two features 303, and deinterleaving the stream of pulses using the at least one adjusted weight 305.

Deinterleaving a stream of pulses received by a radar receiver 301 can include, for example, determining whether each of a plurality of received pulses is a member of one or more clusters. In accordance with various embodiments, each cluster has an anchor point, each received pulse, including the anchor point, has a respective feature vector, and each feature vector includes at least two features, wherein the at least two features are selected from at least two measured features of each received pulse. The determining, in accordance with various embodiments can include generating at least one weight corresponding to each of the at least two features, calculating, using the at least one weight, a weighted distance between the feature vector of each received pulse and the feature vector of the anchor point, comparing the weighted distance to a distance threshold, and identifying the received pulse as a member of one of the one or more clusters if the weighted distance is less than the distance threshold. Such techniques include, but are not limited to, the techniques as described hereinabove with reference to FIG. 2.

Adjusting the at least one weight corresponding to one or more of the at least two features 303, in accordance with various embodiments, can include selecting one or more reference features from the at least two measured features, acquiring, for each cluster, a measured value of the one or more reference features for each member of the cluster, calculating, for each cluster, a variance of the measured values of each member of the cluster, and comparing the variance of the measured values to a threshold variance. The adjusted weights are then generated by increasing at least one of the at least one weights if the variance is less than the threshold variance or decreasing at least one of the at least one weights if the variance is greater than the threshold variance. Such techniques include, but are not limited to, the techniques as described hereinabove with reference to FIG. 2.

Deinterleaving the stream of pulses using the at least one adjusted weight 305 can include determining whether each of the plurality of received pulses is a member of one or more adjusted clusters. In accordance with various embodiments, each cluster has an anchor point, each received pulse, including the anchor point, has a respective feature vector, and each feature vector includes at least two features, wherein the at least two features are selected from at least two measured features of each received pulse. The determining can, in accordance with various embodiments, include calculating, using the at least one adjusted weight, an adjusted weighted distance between the adjusted feature vector of the received pulse and the adjusted feature vector of the adjusted anchor point, comparing the adjusted weighted distance to an adjusted distance threshold, and identifying the received pulse as a member of the one or more adjusted clusters if the adjusted weighted distance is less than the adjusted distance threshold. Such techniques include, but are not limited to, the techniques as described hereinabove with reference to FIG. 2.

Figure 4A:
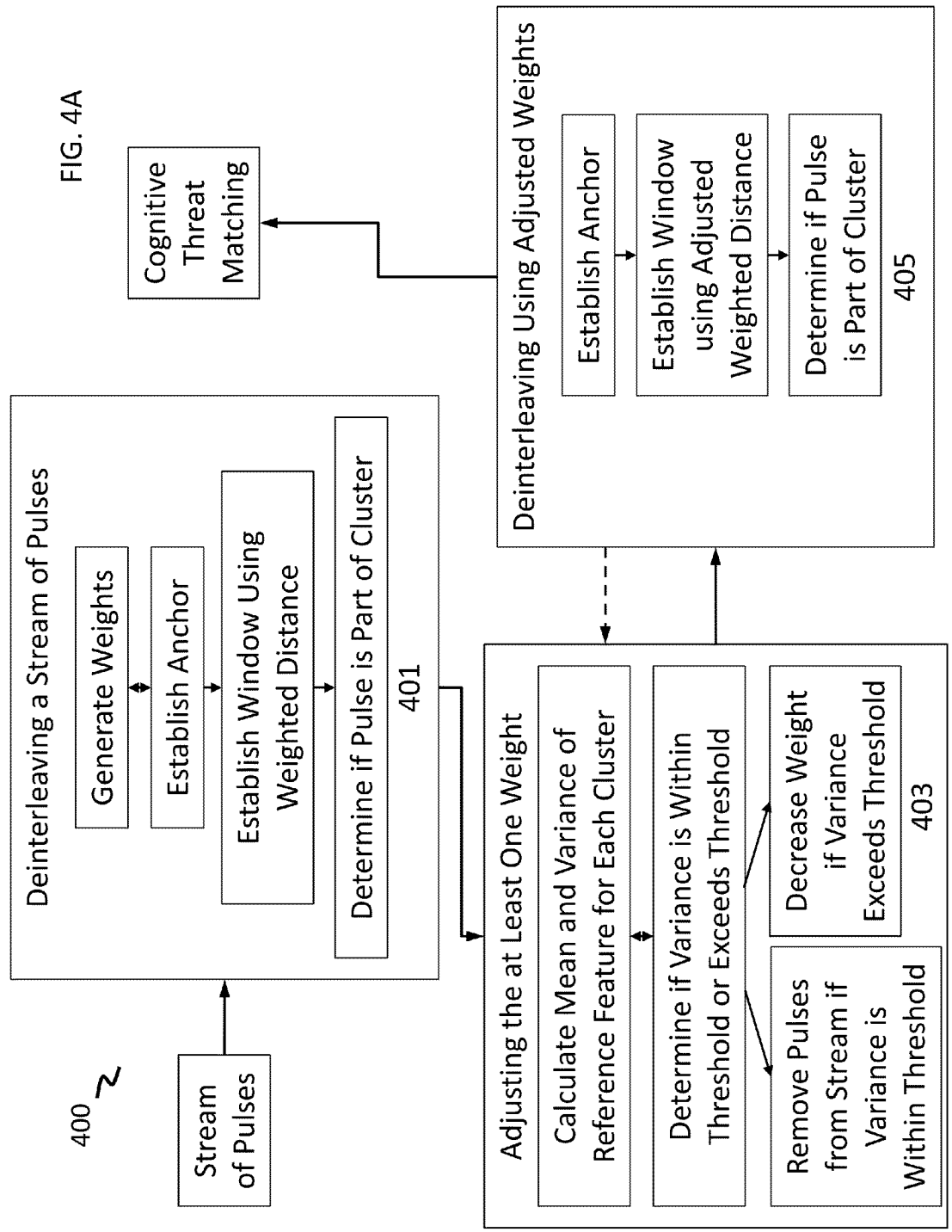
FIGS. 4A-4B are flow charts illustrating an alternative method for performing adaptive dynamic cluster deinterleaving in accordance with various embodiments.
Figure 4B:
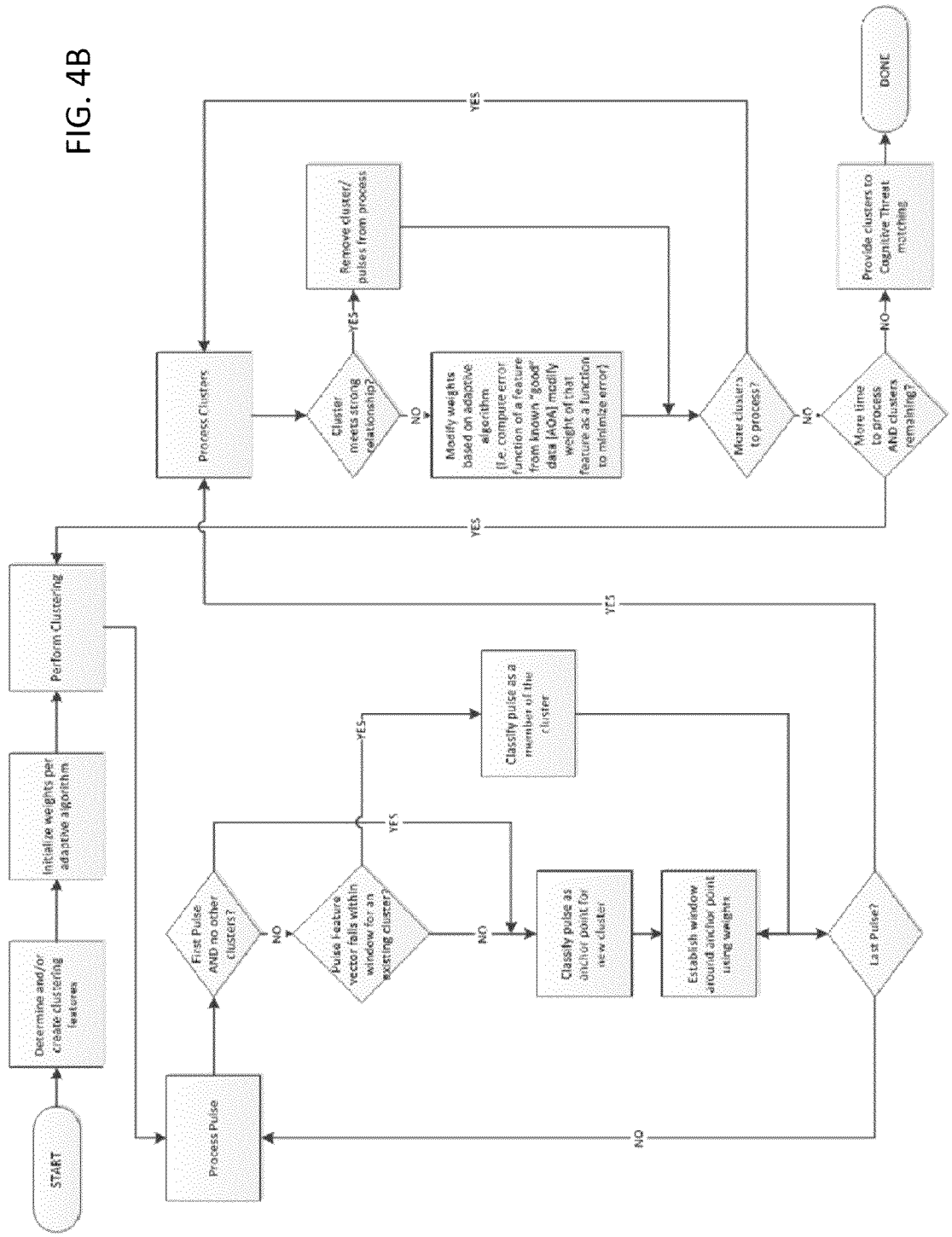

With reference to FIGS. 4A-4B, a method 400 for adaptive dynamic cluster deinterleaving in accordance with various embodiments includes the steps of deinterleaving a stream of pulses received by a radar receiver 401, adjusting the at least one weight corresponding to one or more of the at least two features 403, and deinterleaving the adjusted stream of pulses using the at least one adjusted weight 405.

Deinterleaving a stream of pulses received by a radar receiver 401 can include, for example, determining whether each of a plurality of received pulses is a member of one or more clusters. In accordance with various embodiments, each cluster has an anchor point, each received pulse, including the anchor point, has a respective feature vector, and each feature vector includes at least two features, wherein the at least two features are selected from at least two measured features of each received pulse. The determining, in accordance with various embodiments can include generating at least one weight corresponding to each of the at least two features, calculating, using the at least one weight, a weighted distance between the feature vector of each received pulse and the feature vector of the anchor point, comparing the weighted distance to a distance threshold, and identifying the received pulse as a member of one of the one or more clusters if the weighted distance is less than the distance threshold. Such techniques include, but are not limited to, the techniques as described hereinabove with reference to FIG. 2.

Adjusting the at least one weight corresponding to one or more of the at least two features 403, in accordance with various embodiments, can include selecting one or more reference features from the at least two measured features, acquiring, for each cluster, a measured value of the one or more reference features for each member of the cluster, calculating, for each cluster, a variance of the measured values of each member of the cluster, and comparing the variance of the measured values to a threshold variance. The adjusted weights are then generated by decreasing at least one of the at least one weights if the variance is greater than the threshold variance and removing each member of the cluster from the stream of pulses to generate an adjusted stream of pulses if the variance is less than the threshold variance. Such techniques include, but are not limited to, the techniques as described hereinabove with reference to FIG. 2.

Deinterleaving the adjusted stream of pulses using the at least one adjusted weight 405 can include determining whether each of the plurality of received pulses is a member of one or more adjusted clusters. In accordance with various embodiments, each cluster has an anchor point, each received pulse, including the anchor point, has a respective feature vector, and each feature vector includes at least two features, wherein the at least two features are selected from at least two measured features of each received pulse. The determining can, in accordance with various embodiments, include calculating, using the at least one adjusted weight, an adjusted weighted distance between the adjusted feature vector of the received pulse and the adjusted feature vector of the adjusted anchor point, comparing the adjusted weighted distance to an adjusted distance threshold, and identifying the received pulse as a member of the one or more adjusted clusters if the adjusted weighted distance is less than the adjusted distance threshold. Such techniques include, but are not limited to, the techniques as described hereinabove with reference to FIG. 2.

Figure 5A:
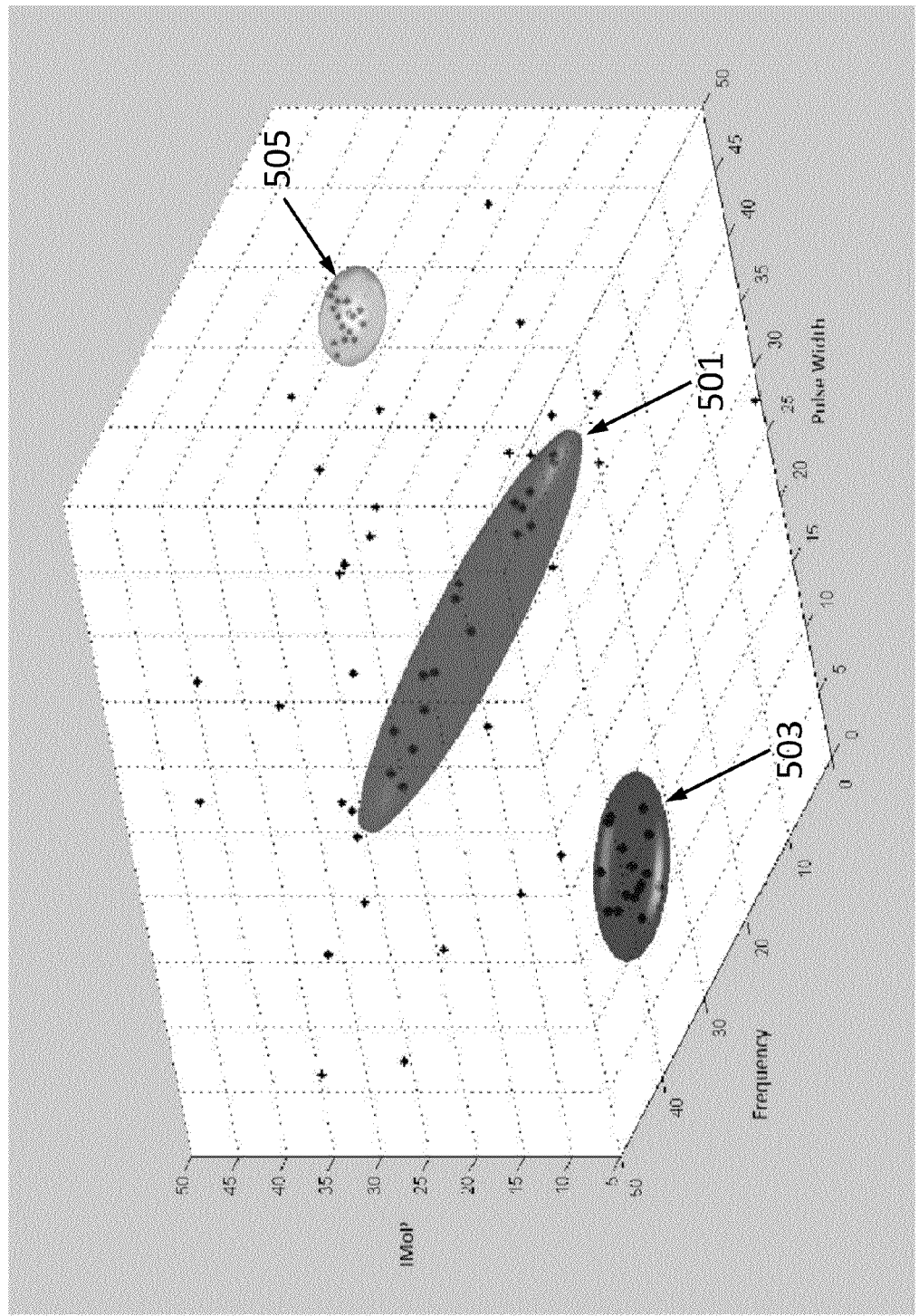
FIGS. 5A-5C are a graphical illustrations of example clusters formed using adaptive dynamic cluster deinterleaving in accordance with various embodiments.
Figure 5B:
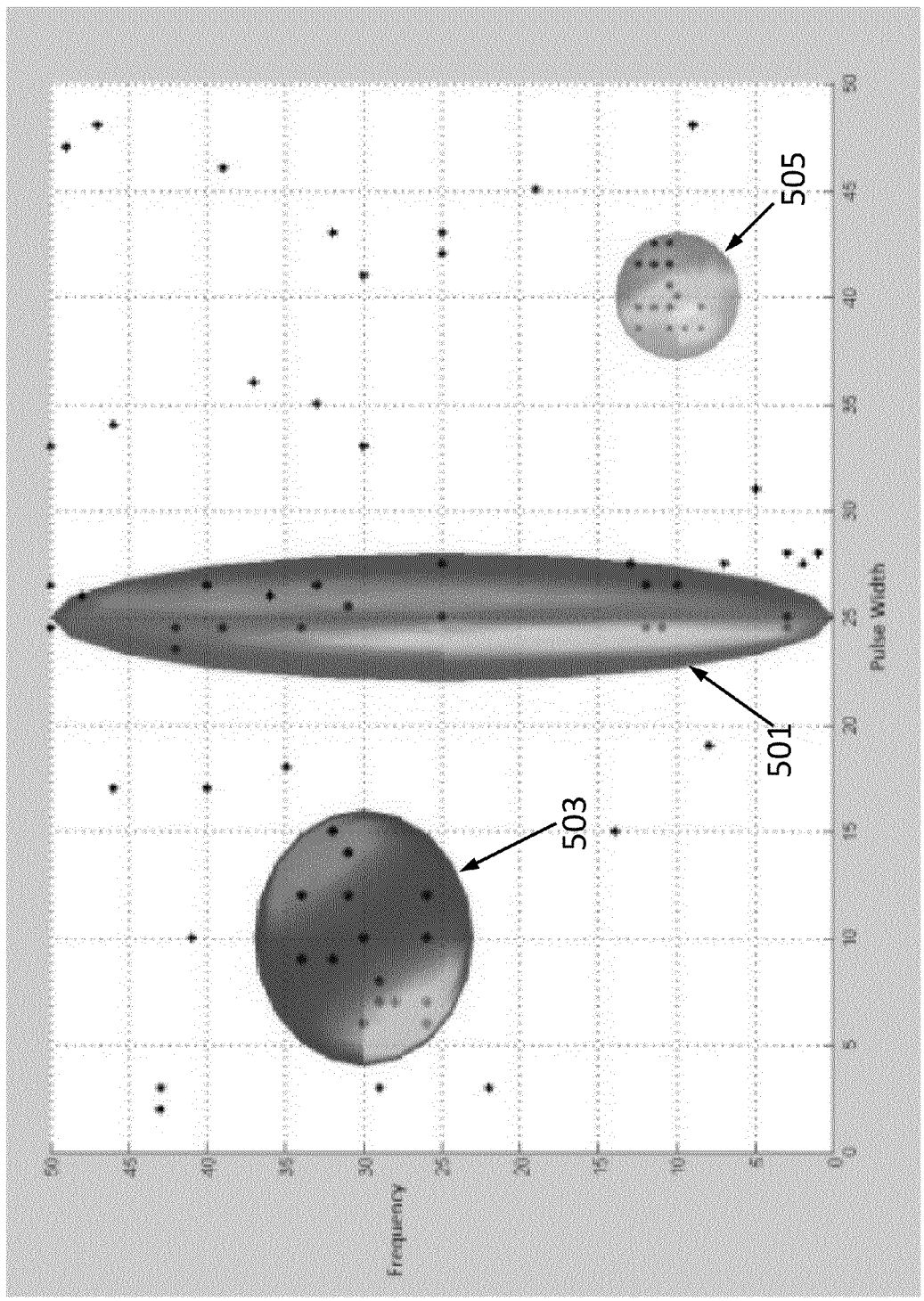
Figure 5C:
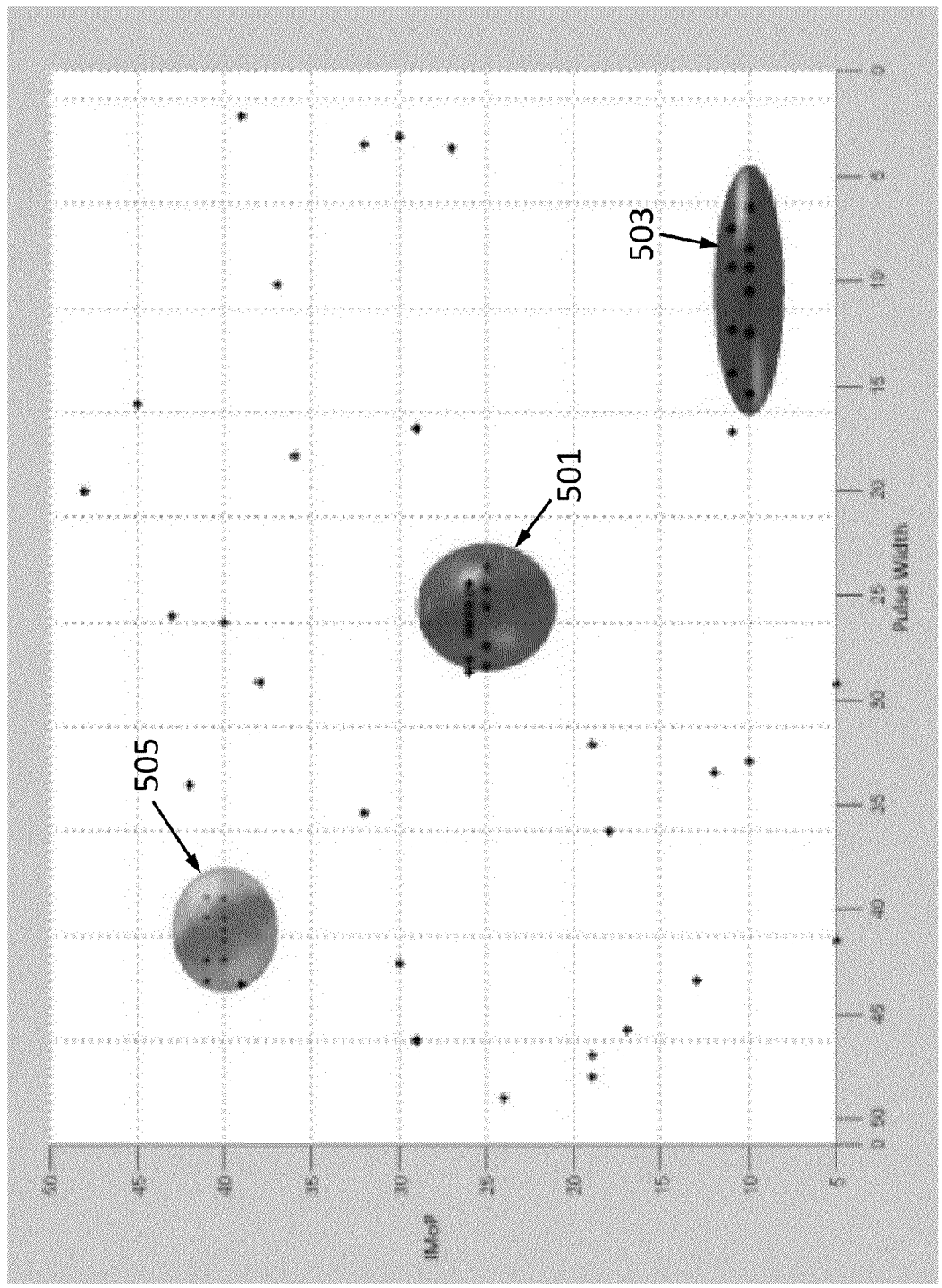

FIGS. 5A-5C illustrate example clusters 501, 503, 505 produced using adaptive dynamic cluster deinterleaving in accordance with various embodiments described herein. As seen in FIG. 5A, the system used frequency, pulse width (PW) and intentional modulation on pulse (IMoP) as features for generating the cluster windows. To arrive at the cluster windows shown in FIGS. 5A-5C, initial weights were set based on previously collected data from known threat systems and then deinterleaving using the initial weights was performed.

Following the initial weight deinterleaving, AOA was chosen as a reference feature because it is a parameter that ground threats cannot rapidly change. For each cluster formed 501, 503, 505, the mean AOA and AOA variance was calculated for each of the pulses in the cluster. The system was configured to vary only one set of weight features at a time, frequency first, then PW, and then IMoP. If the AOA error was less than $2\sigma$, the weight for frequency was decreased, thereby opening up the window. If the AOA error was greater than $2\sigma$, the weight for frequency was increased, thereby tightening the window.

The adaptive dynamic cluster deinterleaver was iteratively re-run and the frequency was increased until the clusters were as close to the variance threshold of $2\sigma$ as possible while still being within tolerance, thereby optimizing the frequency weights. As shown in FIGS. 5A and 5B, cluster 501 was able to expand such that new pulses were added without increased AOA error, so the weight modification continued. By contrast, when clusters 503 and 505 were expanded to include additional pulses, the AOA error increased beyond the variance threshold. Therefore, the weight was increased to tighten the windows again. When none of the clusters 501, 503, 505 was able to continue expanding without exceeding the $2\sigma$ threshold, the adaptive dynamic cluster deinterleaver stopped adjusting the frequency weights.

Then PW weights were modified. As shown in FIGS. 5A-5C, cluster 503 was able to expand such that new pulses were added without increased AOA error, so the weight modification continued. By contrast, when clusters 501 and 505 were expanded to include additional pulses, the AOA error increased beyond the variance threshold. Therefore, the weight was increased to tighten the windows again. When none of the clusters 501, 503, 505 was able to continue expanding without exceeding the $2\sigma$ threshold, the adaptive dynamic cluster deinterleaver stopped adjusting the PW weights.

Then IMoP weights were modified. As shown in FIGS. 5A and 5C, none of the clusters 501, 503, and 505 were able to be expanded to include additional pulses without the AOA error exceeding the variance threshold. Therefore, the weight was increased to tighten the windows back to the original weighted distance and the adaptive dynamic cluster deinterleaver stopped adjusting the IMoP weights.

Once all of the weights were set and all of the clusters formed, a relationship was established within the adaptive dynamic cluster deinterleaving system associating this cluster set with an AOA reference feature. The relationship was stored for future use in establishing initial weights and guiding future weight adjustments.

As a safety precaution within the system, a cutoff for stopping the process was included. In a real-time system (e.g., as used on a military aircraft) there are limited processing resources and there is limited time before the next stream of pulses needs to be processed. Additionally, when more complex, non-sequential weight adjustments, the error minimization functions can diverge and fail to reach a minimum. Due to such limitations, timed cutoffs were included to limit the duration of iterative processing performed by the system on each stream of pulses, thereby ensuring the availability of sufficient processing resources for subsequent pulse streams.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present disclosure has been described with reference to example embodiments, it is understood that the words that have been used herein, are words of description and illustration, rather than words of limitation. Changes may be made, within the purview of the appended claims, as presently stated and as amended, without departing from the scope and spirit of the present disclosure in its aspects.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method for adaptive dynamic cluster deinterleaving of received radar pulses in a radar system, the method comprising:
    deinterleaving a stream of pulses received by a radar receiver by determining whether each of a plurality of received pulses is a member of one or more clusters, each cluster having an anchor point, each received pulse and the anchor point having a respective feature vector, each feature vector having at least two features, wherein the at least two features are selected from at least two measured features of each received pulse, the determining performed by:
        generating at least one weight corresponding to each of the at least two features;
        calculating, using the at least one weight, a weighted distance between the feature vector of each received pulse and the feature vector of the anchor point;
        comparing the weighted distance to a distance threshold, and;
        identifying the received pulse as a member of one of the one or more clusters if the weighted distance is less than the distance threshold;
    adjusting the at least one weight corresponding to one or more of the at least two features by:
        selecting one or more reference features from the at least two measured features;
        acquiring, for each cluster, a measured value of the one or more reference features for each member of the cluster;
        calculating, for each cluster, a variance of the measured values of each member of the cluster;
        comparing the variance of the measured values to a threshold variance, and;
        increasing at least one of the at least one weights if the variance is less than the threshold variance or decreasing at least one of the at least one weights if the variance is greater than the threshold variance to generate at least one adjusted weight; and
    deinterleaving the stream of pulses using the at least one adjusted weight by determining whether each of the plurality of received pulses is a member of one or more adjusted clusters, each adjusted cluster having an adjusted anchor point, each received pulse and the adjusted anchor point having a respective adjusted feature vector, each adjusted feature vector having at least two adjusted features correlating to the at least one adjusted weight, the determining performed by:
        calculating, using the at least one adjusted weight, an adjusted weighted distance between the adjusted feature vector of the received pulse and the adjusted feature vector of the adjusted anchor point;
        comparing the adjusted weighted distance to an adjusted distance threshold, and;
        identifying the received pulse as a member of the one or more adjusted clusters if the adjusted weighted distance is less than the adjusted distance threshold.

2. The method of claim 1, further comprising iterating, at least once, the step of adjusting the at least one weight.

3. The method of claim 2, further comprising iterating, at least once, the step of deinterleaving the stream of pulses using the at least one adjusted weight.

4. The method of claim 1, further comprising identifying, using a cognitive threat matching system, one or more radar transmitters associated with one or more values of at least one of the measured features of the members of at least one of the adjusted clusters.

5. The method of claim 1, wherein the step of generating at least one weight further comprises providing weights for the at least two features according to known radar transmitter operating parameters.

6. The method of claim 1, wherein the step of generating at least one weight further comprises randomly selecting weights for each of at least two features.

7. The method of claim 1, wherein the weighted distance is calculated in accordance with $d(x,y)=\sqrt{(x-y)^T B(x-y)}$, wherein x is the feature vector of a particular received pulse, y is the feature vector of the anchor point, and B is a weighting matrix.

8. A method for adaptive dynamic cluster deinterleaving of received radar pulses in a radar system, the method comprising:
    deinterleaving a stream of pulses received by a radar receiver by determining whether each of a plurality of received pulses is a member of one or more clusters, each cluster having an anchor point, each received pulse and the anchor point having a respective feature vector, each feature vector having at least two features, wherein the at least two features are selected from at least two measured features of each received pulse, the determining performed by:
        generating at least one weight corresponding to each of the at least two features;
        calculating, using the at least one weight, a weighted distance between the feature vector of each received pulse and the feature vector of the anchor point;
        comparing the weighted distance to a distance threshold, and;
        identifying the received pulse as a member of one of the one or more clusters if the weighted distance is less than the distance threshold;
    adjusting the at least one weight corresponding to one or more of the at least two features by:
        selecting one or more reference features from the at least two measured features;

acquiring, for each cluster, a measured value of the one or more reference features for each member of the cluster;

calculating, for each cluster, a variance of the measured values of each member of the cluster;

comparing the variance of the measured values to a threshold variance, and;

decreasing at least one of the at least one weights if the variance is greater than the threshold variance to generate at least one adjusted weight;

removing, for each cluster having a variance less than the threshold variance, each member of the cluster from the stream of pulses to generate an adjusted stream of pulses; and deinterleaving the adjusted stream of pulses using the at least one adjusted weight by determining whether each of a plurality of adjusted pulses is a member of one or more adjusted clusters, each adjusted cluster having an adjusted anchor point, each adjusted pulse and the adjusted anchor point having a respective adjusted feature vector, each adjusted feature vector having at least two adjusted features correlating to the at least one adjusted weight, the determining performed by:

calculating, using the at least one adjusted weight, an adjusted weighted distance between the adjusted feature vector of the adjusted pulse and the adjusted feature vector of the adjusted anchor point;

comparing the adjusted weighted distance to an adjusted distance threshold, and;

identifying the adjusted pulse as a member of the one or more adjusted clusters if the adjusted weighted distance is less than the adjusted distance threshold.

9. The method of claim 8, further comprising iterating, at least once, the step of adjusting the at least one weight.

10. The method of claim 9, further comprising iterating, at least once, the step of deinterleaving the adjusted stream of pulses using the at least one adjusted weight.

11. A system for adaptive dynamic cluster deinterleaving of received radar pulses in a radar system, comprising:

one or more processors; and a memory, the memory including executable code representing instructions that when executed cause the one or more processors to:

deinterleave a stream of pulses received by a radar receiver by determining whether each of a plurality of received pulses is a member of one or more clusters, each cluster having an anchor point, each received pulse and the anchor point having a respective feature vector, each feature vector having at least two features, wherein the at least two features are selected from at least two measured features of each received pulse, the determining performed by:

generating at least one weight corresponding to each of the at least two features;

calculating, using the at least one weight, a weighted distance between the feature vector of each received pulse and the feature vector of the anchor point;

comparing the weighted distance to a distance threshold, and;

identifying the received pulse as a member of one of the one or more clusters if the weighted distance is less than the distance threshold;

adjust the at least one weight corresponding to one or more of the at least two features by:

selecting one or more reference features from the at least two measured features;

acquiring for each cluster, a measured value of the one or more reference features for each member of the cluster;

calculating for each cluster, a variance of the measured values of each member of the cluster;

comparing the variance of the measured values to a threshold variance, and;

increasing at least one of the at least one weights if the variance is less than the threshold variance or decreasing at least one of the at least one weights if the variance is greater than the threshold variance to generate at least one adjusted weight; and deinterleave the stream of pulses using the at least one adjusted weight by determining whether each of the plurality of received pulses is a member of one or more adjusted clusters, each adjusted cluster having an adjusted anchor point, each received pulse and the adjusted anchor point having a respective adjusted feature vector, each adjusted feature vector having at least two adjusted features correlating to the at least one adjusted weight, the determining performed by:

calculating, using the at least one adjusted weight, an adjusted weighted distance between the adjusted feature vector of the received pulse and the adjusted feature vector of the adjusted anchor point;

comparing the adjusted weighted distance to an adjusted distance threshold, and;

identifying the received pulse as a member of the one or more adjusted clusters if the adjusted weighted distance is less than the adjusted distance threshold.

12. The system of claim 11, further comprising a radar receiver for receiving the stream of pulses.

13. The system of claim 11, further comprising a transmitter for transmitting one or more measured values of the at least two measured features of each member of each cluster and each adjusted cluster to a cognitive threat matching system.

14. The system of claim 13, wherein the cognitive threat matching system identifies one or more radar transmitters associated with one or more values of at least one of the measured features of the members of at least one of the adjusted clusters.

* * * * *